United States Patent [19]
Eskandry

[11] Patent Number: 5,516,018
[45] Date of Patent: * May 14, 1996

[54] MULTI-FUNCTION AUTOMOBILE VISOR UNIT

[76] Inventor: Ezra D. Eskandry, 1925 Brickell Ave. D901, Miami, Fla. 33129

[ * ] Notice: The portion of the term of this patent subsequent to Feb. 23, 2014, has been disclaimed.

[21] Appl. No.: 369,463

[22] Filed: Jan. 6, 1995

Related U.S. Application Data

[63] Continuation-in-part of Ser. No. 200,644, Feb. 23, 1994, Pat. No. 5,379,929.

[51] Int. Cl.$^6$ .................................................. B60R 7/00
[52] U.S. Cl. ..................... 224/312; 296/97.5; 296/97.6; 296/97.8
[58] Field of Search ..................... 224/311, 312; 296/97.5, 97.6, 97.8, 97.9, 97.11

[56] References Cited

U.S. PATENT DOCUMENTS

| | | | |
|---|---|---|---|
| 2,617,573 | 11/1952 | Nahoom | 224/42.42 |
| 2,733,763 | 2/1956 | Nygaard | 160/32 |
| 3,016,262 | 1/1962 | Hunt | 296/97 |
| 4,978,160 | 12/1990 | Welschoff | 296/97 |
| 5,098,149 | 3/1992 | Lee | 296/97.6 |
| 5,259,657 | 11/1993 | Arendt | 296/97 |
| 5,301,856 | 4/1994 | Newsome | 224/312 |

*Primary Examiner*—J. Casimer Jacyna
*Attorney, Agent, or Firm*—Robert C. Kain, Jr.

[57] ABSTRACT

The accessory carrier is mountable on a window visor of an automobile. The visor has a predetermined thickness and the accessory carrier is a three layer, generally planar, composite carrier having a thickness substantially the same as the visor thickness. One outer layer of the carrier has a longitudinal slot therein through which a tinted, planar viewing screen is laterally extendable. In another embodiment, an opaque sunscreen is stored in the carrier. The viewing screen or sunscreen has opposing sawteeth laterally extending from opposing sides thereof such that the sawteeth interact and coact with the terminal ends of the longitudinal slot of the outer layer of the carrier. The sawteeth provide digital or precise positioning of the screen with respect to the accessory as well as the window visor since the carrier is mounted on the visor itself. The accessory carrier also includes a closable, longitudinal slot in the opposite outer layer. This layer is normally exposed to the occupant of the automobile. An intermediate layer between the two outer layers divides the interior space of the accessory carrier into two compartments. The closable longitudinal slot defines a mouth for one interior compartment in the carrier. The tinted viewing screen or sunscreen is disposed in the other compartment formed by the intermediate layer. The accessory carrier is mounted to the window visor by at least one strap large enough to encircle the visor. The carrier also includes pocket flaps on the exposed outer layer which define at least two pockets for the storage of accessories by the occupant. In another embodiment, the viewing screen is replaced with a plurality of dividers. The dividers cooperatively define interior spaces which contain information that they may be useful to an occupant of the automobile.

20 Claims, 6 Drawing Sheets

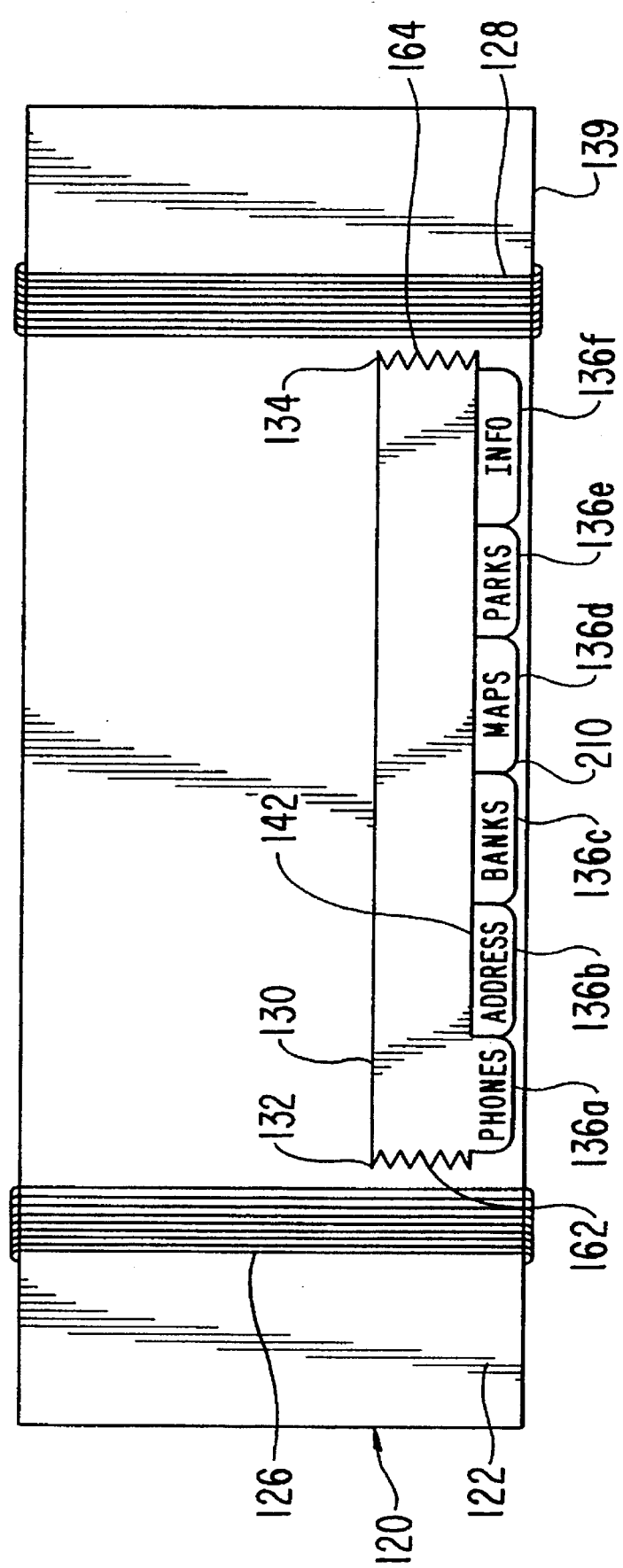

MULTI-FUNCTION AUTOMOBILE VISOR UNIT

This is a continuation-in-part of U.S. patent application Ser. No. 08/200,644 filed Feb. 23, 1994, now U.S. Pat. No. 5,379,929.

BACKGROUND OF THE INVENTION

The present invention relates to a automobile visor unit or an accessory carrier mounted on a window visor in an automobile.

It is sometimes convenient for the occupant or driver of an automobile to store accessories, such as eyeglasses, gas credit cards, keys, wallet, miscellaneous paper items as well as pens and pencils, in a readily accessible location within the interior of an automobile. Most automobiles include a window visor which is rotatably mounted to the roof of an automobile or the support structure for the front windshield. Commonly, these window visors rotate to forward and aft positions such that in the forward position, the driver, if the visor is adjacent to the driver's position, is provided with a small pulled down sunshade in the upper region of the front windshield. In the aft position, the windshield visor is in a stored position adjacent to and in a plane generally parallel to the plane of the roof of the automobile. Further, window visors may be rotatably mounted such that the visor can swing from a forward position (corresponding to the visor acting as a front shade for the driver) to a side position such that the visor becomes a side window shade immediately to the left of the driver. In the side shade position, the visor is generally disposed in a plane substantially parallel to the plane of the driver's side window of the automobile. Also, the automobile usually includes a visor for the passenger in the automobile.

OBJECTS OF THE INVENTION

It is an object of the present invention to provide a multi-function automobile visor unit.

It is another object of the present invention to provide an accessory carrier which is substantially the same thickness as the window visor on an automobile.

It is another object of the present invention to provide an accessory carrier which includes a pull-down viewing screen which acts as a supplemental auto shade for the occupant of the automobile.

It is another object of the present invention to provide a viewing screen, acting as a supplemental autoshade for the occupant, which can be positioned at discrete, defined extending positions from a fully stored or retracted position to a fully extended position.

It is a further object of the present invention to provide an opaque screen, acting as a supplemental autoshade for the occupant, which can be positioned at discrete, defined extending positions from a fully stored or retracted position to a fully extended position.

It is another object of the present invention to provide a multi-function accessory carrier mounted on a window visor of an automobile which includes detachable, supplemental accessory carriers (such as sunglass cases and wallets).

It is a object of the present invention to provide an accessory carrier mountable on a window visor which includes a closable compartment, a retractable tinted viewing screen or a retractable opaque screen, a plurality of pockets (one of which is transparent), and a pencil or pen loop holder.

It is another object of the present invention to provide an accessory carrier that includes a plurality tabbed dividers, substantially coincident with the retractable tinted or opaque screen, which compartmentalize information that maybe useful for the user in the automobile.

It is a further object of the present invention to provide an accessory carrier mountable on a window visor which includes a closeable compartment, retractable tabbed dividers, a plurality of pockets (one of which is transparent), and a pencil or pen loop holder.

SUMMARY OF THE INVENTION

The accessory carrier is mountable on a window visor of an automobile. The visor has a predetermined thickness and the accessory, carrier is a three layer, generally planar, composite carrier having a thickness substantially the same as the visor thickness. One outer layer of the carrier has a longitudinal slot therein through which a tinted, planar viewing screen is laterally extendable. Alternatively, an opaque screen may be disposed in the slot. The screen has opposing sawteeth laterally extending from opposing sides thereof such that the sawteeth interact and coact with the terminal ends of the longitudinal slot of the outer layer of the carrier. The sawteeth provide digital or precise positioning of the screen with respect to the accessory as well as the window visor since the carrier is mounted on the visor itself. The accessory carrier also includes a closable, longitudinal slot in the opposite outer layer. This layer is normally exposed to the occupant of the automobile. An intermediate layer between the two outer layers divides the interior space of the accessory carrier into two compartments. The closable longitudinal slot defines a mouth for one interior compartment in the carrier. In one embodiment the screen is disposed in the other compartment formed by the intermediate layer. In an alternative embodiment, a plurality of tabbed dividers are disposed in the other compartment formed by the intermediate layer. The tabbed dividers may be coincident with the retractable and extendable shade screen. The accessory carrier is mounted to the window visor by at least one strap large enough to encircle the visor. The carrier also includes pocket flaps on the exposed outer layer which define at least two pockets for the storage of accessories by the occupant.

BRIEF DESCRIPTION OF THE DRAWINGS

Further objects and advantages of the present invention can be found in the detailed description of the preferred embodiments when taken in conjunction with the accompanying drawings in which:

FIG. 10 diagrammatically illustrates a rear or back side of an alternative embodiment of the accessory carrier with a plurality of tabbed dividers; and, FIG. 11 diagrammatically illustrates a front or exposed side of an alternative embodiment of the accessory carrier with extendable, tabbed dividers or shades.

DETAILED DESCRIPTION OF THE PREFERRED EMBODIMENTS

The present invention relates to a multi-function automobile visor unit or accessory carrier mountable on a window visor.

Figure 1:
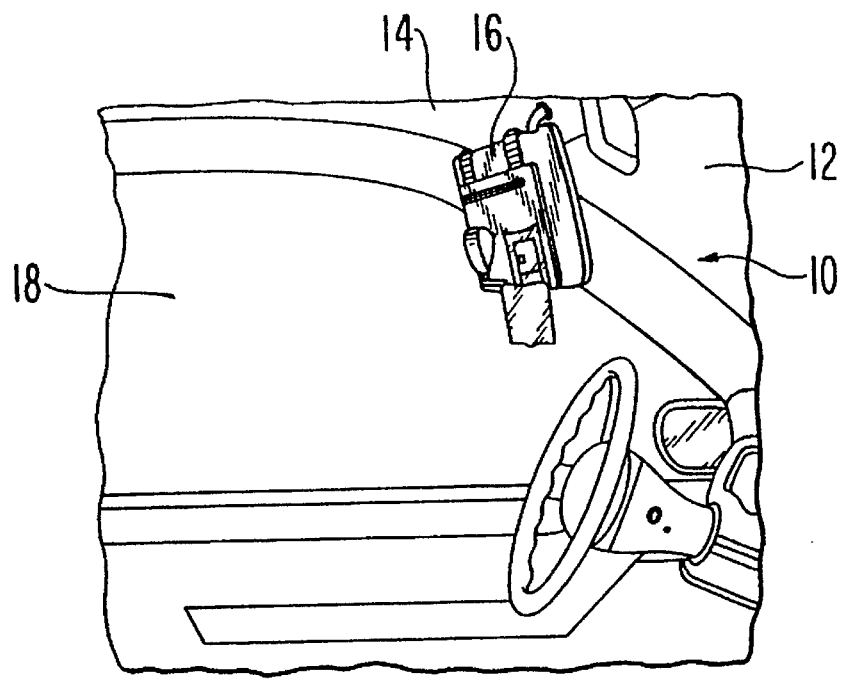
FIG. 1 diagrammatically illustrates an elevational, interior, side view of an automobile showing the window visor in a forward, front shade position and the accessory carrier mounted thereon in a forward, front shade position.
Figure 2:
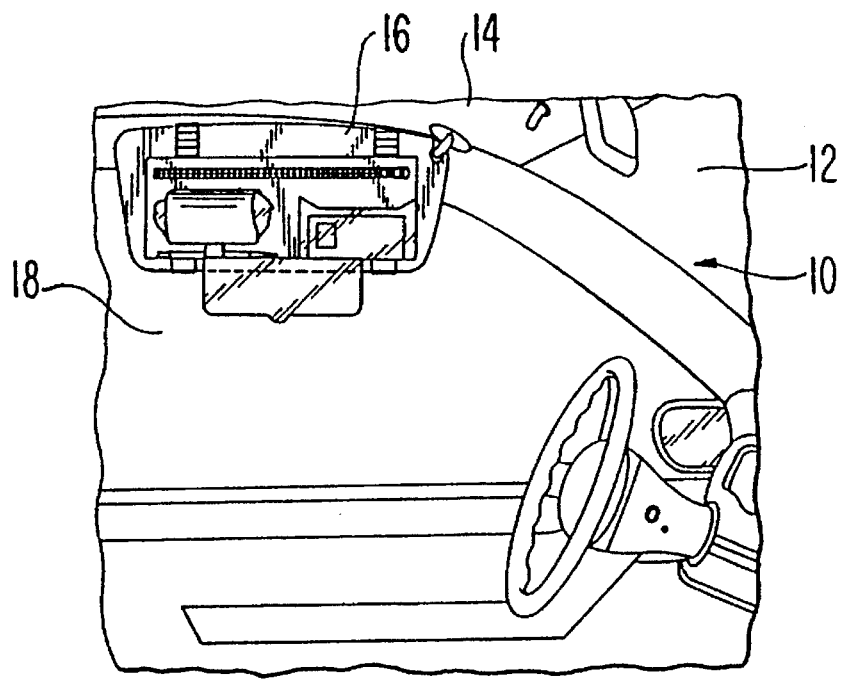
FIG. 2 diagrammatically illustrates a side, elevational, interior view of an automobile wherein the window visor has been rotated to side shade position and further illustrates the accessory carrier mounted on the visor.

FIGS. 1 and 2 diagrammatically illustrate interior, side elevational views of an automobile 10 having a front windshield 12, a roof 14, and a visor 16 rotatably mounted to roof 14 of automobile 10. In FIG. 1, visor 16 is in a forward shade position wherein the visor is rotated downward such that visor 16 forms a partial autoshade for the driver. In FIG. 2, visor 16 has been swung to the side such that it is in a plane generally parallel to the plane of automobile side window 18. In the side shade position illustrated in FIG. 2, visor 16 also provides a partial autoshade for the occupant. In FIG. 1, the viewing screen of the accessory carrier acts as a retractable sun screen which can be positioned at discrete, extended positions relative to the visor. In FIG. 2, the retractable sun screen in the carrier acts as a partial screen for blocking light directed at the side of the occupant.

It should be appreciated that automobiles customarily include visors for the driver and the front passenger. The accessory carrier or visor unit described herein can be used with any window visor in an automobile.

Figure 3:
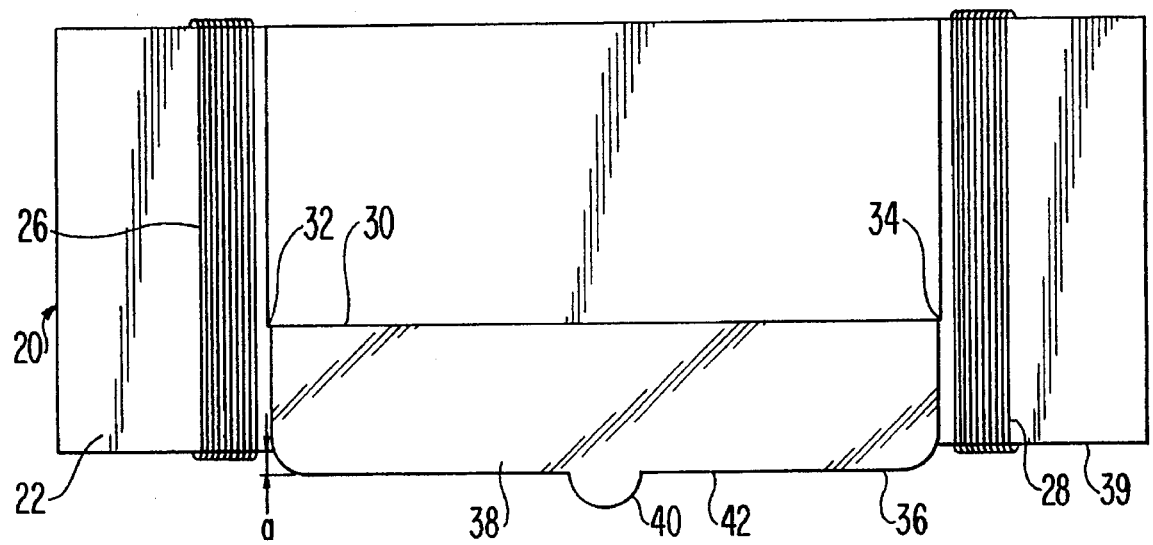
FIG. 3 diagrammatically illustrates a rear or back side of the accessory carrier.
Figure 4:
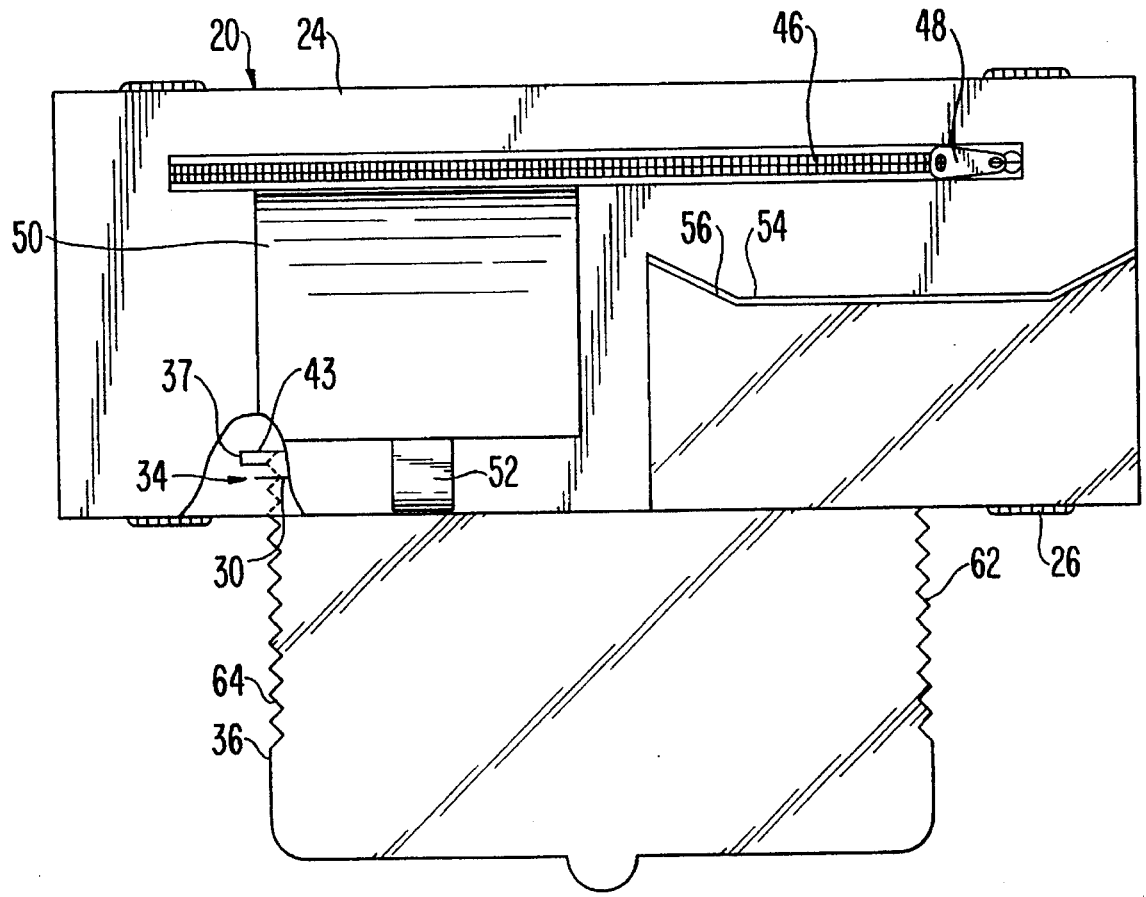
FIG. 4 diagrammatically illustrates a front or exposed side of the accessory carrier, particularly showing the viewing screen extending laterally from the carrier.

FIG. 3 diagrammatically illustrates accessory carrier 20 and particularly illustrates a back side or rear outer layer 22 of carrier 20. The front side of accessory carrier 20 is shown in FIG. 4 and is identified as outer, exposed or front layer 24. Returning to FIG. 3, carrier 20 includes at least one and preferably two straps 26 and 28 which are large enough to encircle visor 16 (FIGS. 1 and 2) rotatably mounted in the interior of the automobile. Preferably, these straps are made of highly flexible material and most preferably, are made of an elastic material.

Figure 6:
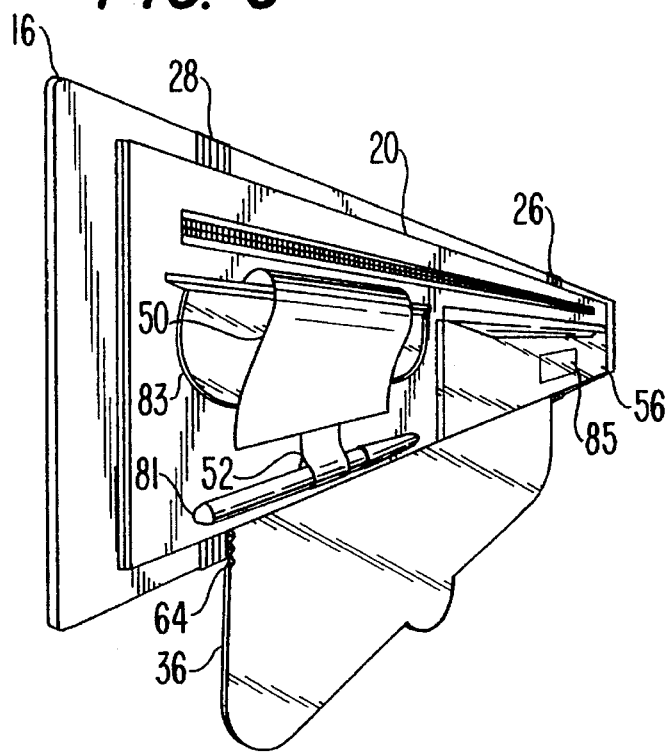
FIG. 6 diagrammatically illustrates a perspective view of the accessory carrier.
Figure 7:
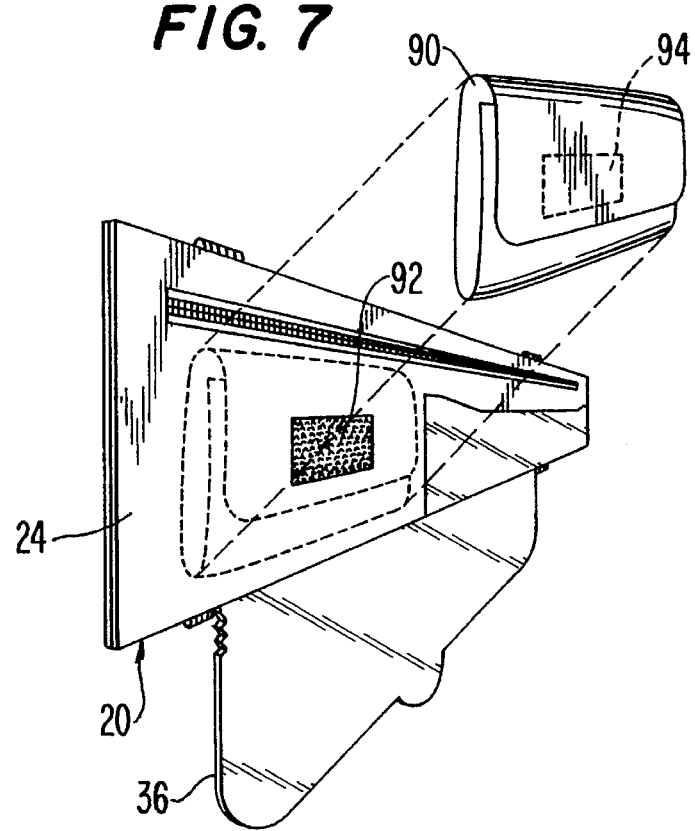
FIG. 7 diagrammatically illustrates another perspective view of the accessory carrier with a wallet or supplemental accessory carrier detachably associated with the carrier.

Back side layer 22 of accessory carrier 20 includes a longitudinal slot 30 having terminal ends 32 and 34. Preferably, accessory carrier 20 is rectangularly shaped. As shown in FIGS. 6 and 7, the carrier is generally planar and its thickness is substantially similar to the thickness of visor 16. The overall rectangular size of the carrier is ideally about 80% of the size of the visor.

A timed, planar viewing screen 36 extends through and beyond longitudinal slot 30 and at least partially outboard of the interior of carrier 20. The planar viewing screen is preferably a high quality, light filter, plastic sheet which may be made of LEXAN plastic manufactured by General Electric. Viewing screen 36 includes an outboard segment 38 which defines an operator interface for pulling the viewing screen from a stored position shown in FIG. 3 to a laterally fully extended position shown in FIG. 6. In the preferred embodiment, the operator interface is defined by a semicircular tab 40 protruding from a lower longitudinal edge 42 of view screen 36. In the preferred embodiment, outboard segment 38 protrudes a short distance "a" beyond the lower longitudinal edge 39 of accessory carrier 20. Distance "a" is approximately ¼".

Figure 5:
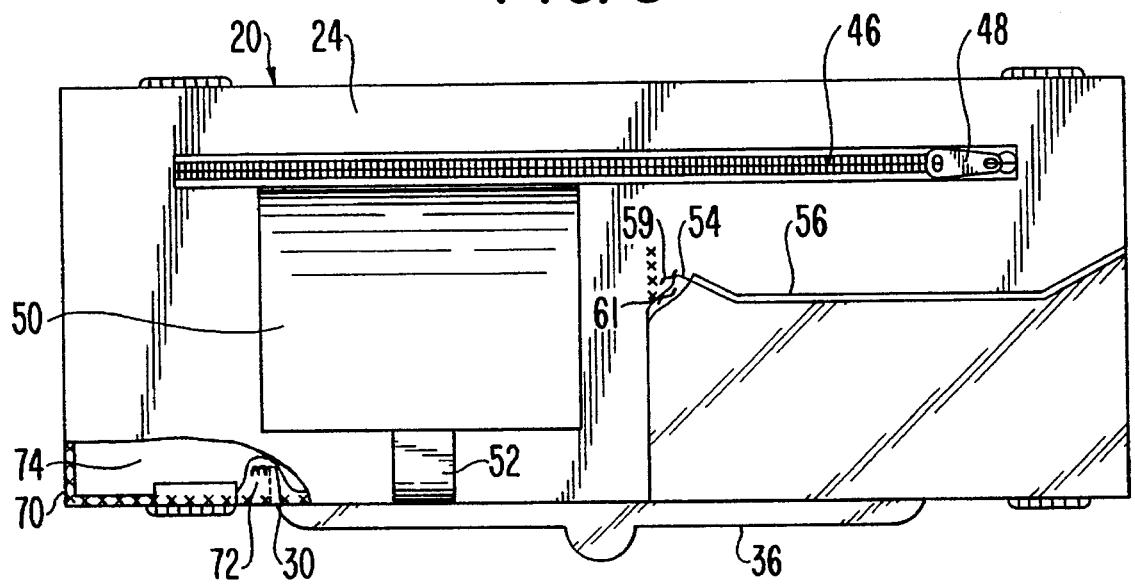
FIG. 5 diagrammatically illustrates the accessory carrier and various components thereof.

FIGS. 4 and 5 diagrammatically illustrate accessory carrier 20 and particularly the front side outer layer 24. In use, back side 22 (FIG. 3) of carrier 20 is disposed adjacent to the visor. Front side 24 of carrier 20 enables the occupant to access a wide variety of accessory containment structures, such that the occupant can utilize compartments, holders and pockets at will. Back side 22 of accessory carrier 20 is mounted to adjacent visor 16 via elastic straps 26, 28. The front side layer 24 includes a closable, longitudinal slot 46 which includes a zipper closure 48. In one embodiment, front side 24 also includes an eyeglass loop 50 which is shown in greater detail in FIG. 6. Front side 24 also includes a pen or a pencil loop holder 52. Again, this loop or accessory holder is better shown in FIG. 6. Front side 26 includes at least a pair of pocket flaps 54 and 56. These pocket flaps define at least two pockets. In FIG. 5, flap 54 defines a pocket in interior space 59. Flap 56 is transparent and defines a pocket in interior space 61. In one embodiment, pockets 54 and 56 are attached to front side layer 24 by sewing or glue or a combination thereof. The sewn attachment is shown with an "x" in these illustrations.

FIG. 4 shows viewing screen 36 as being fully extend from the interior portion of accessory carrier 20. Viewing screen 36 has been pulled from the interior portion of carrier 20 by pulling the screen from longitudinal slot 30. Viewing screen 36 includes opposing sawteeth 62, 64 which coact and interact with the terminal ends of longitudinal slot 30. Particularly, sawteeth 64 coact with terminal end 34 of slot 30. This coaction enables the occupant to discretely position viewing screen 36 at various extension positions beyond the stored position of the screen shown in FIG. 3. In a sense, the sawteeth enable digital positioning of the viewing screen with respect to accessory, carrier 20, and also the visor 16 itself, since carrier 20 is securely mounted to the visor. Screen 36 is captured in the interior of the carrier by a pair of opposing tabs, one of which is tab 37 extending from longitudinal edge 43. The opposing, interior tabs substantially prohibit complete withdrawal of the screen from the interior space of the carrier by catching on the terminal ends of longitudinal slot 30.

FIG. 5 shows certain interior portions of carrier 20 and particularly an intermediate layer 70 which is illustrated by the cut away front layer 24. Intermediate layer 70 is also cut-away to expose longitudinal slot 30 and viewing screen 36 disposed in an interior compartment 72 of accessory carrier 20. Intermediate layer 70 divides the interior portion of carrier 20 into a first compartment, identified as compartment 72 in FIG. 5, and a second compartment, identified as compartment 74 in FIG. 5. Zippered closable slot 46 on front side 24 provides access to interior compartment 74 of the accessory carrier. Intermediate layer 70 completely divides the interior space of the accessory carrier 20 such that items placed in the zippered compartment do not fall from the carrier through back side longitudinal slot 30 which enables withdrawal and retraction of viewing screen 36 from the second compartment 72 of the carrier. In a preferred embodiment, the back side and front side layers are sewn together as shown by the x's in FIG. 5. Also, in a preferred embodiment, the back side and front side layers are generally flexible and may be made of a material which simulates leather. Intermediate layer 70 is substantially rigid (preferably cardboard) and provides for a generally rectangular, planar composite carrier 20. Rigid intermediate layer 70 also provides good solid support for stored viewing screen 36.

In FIGS. 6 and 7, viewing screen 36 has been partially retracted to reveal sawteeth control surfaces, one of which is control surface 64. The thickness of accessory carrier is substantially the same as the thickness of visor 16. Straps 28 and 26 wrap around visor 16 thereby providing secure mounting of accessory carrier 20 to the visor. A pen 81 is disposed in pen or pencil loop 52. Eyeglasses 83 are disposed in eyeglass loop 50. Transparent outer pocket 56 reveals an occupant's accessory 85 which may be a driver's license.

In FIG. 7, accessory carrier 20 includes a removable wallet 90 which is removably attachable to front surface 24 via a hook and loop fastener set. As used herein, a hook and loop fastener set is defined as a removable attachment mechanism currently identified as VELCRO fasteners. In FIG. 7, one element of the hook and loop set is shown as patch 92. The other element of the hook and loop fastener set is shown as patch 94. Wallet 90 can be securely mounted onto front side cover 24 of accessory carrier 20 by placing fastener element 94 atop fastener element 92. Further, eyeglass carrier 50 can be configured to be removably detachable with a similar hook and loop fastening device as shown in conjunction with FIG. 7 and wallet 90.

Figure 8:
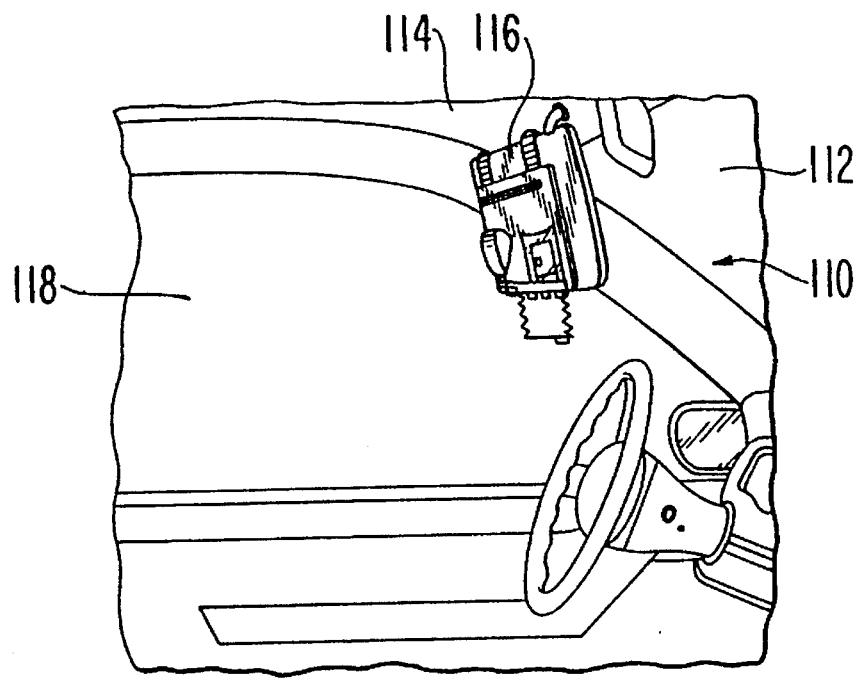
FIG. 8 diagrammatically illustrates an elevational, interior, side view of an automobile showing an alternative embodiment of the window visor in a forward, front shade position, the accessory carrier mounted thereon in a forward, front shade position and a tabbed opaque extending therefrom.
Figure 9:
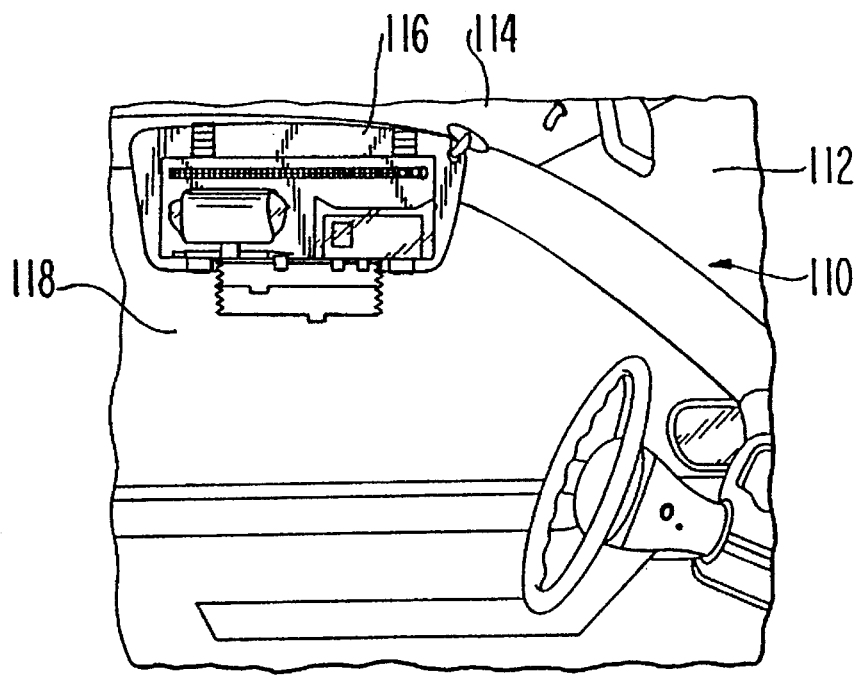
FIG. 9 diagrammatically illustrates a side, elevational, interior view of an automobile wherein the window visor has been rotated to the side shade position, further illustrates an alternative embodiment of the accessory carrier mounted on visor with two tabbed shades or dividers extending therefrom.

FIGS. 8 and 9 diagrammatically illustrate interior, side elevational views of an automobile 110 having a front shield 112, and a roof 114, and a visor 116 rotatable mounted to roof 114 of automobile 110. In FIG. 8, visor 116 is in a forward shape position wherein visor is rotated downward such that visor 116 forms a partial auto shade for the driver. The opaque, tabbed screen is partially extended from the unit. In FIG. 9, visor 116 has been swung to the side such that it is in a plain generally parallel to the plain of the automobile side window 118. As shown, two tabbed dividers or screens are extended from the unit. In the side shade position illustrated in FIG. 9, visor 116 also provides a partial auto shade for the occupant.

Figure 11:
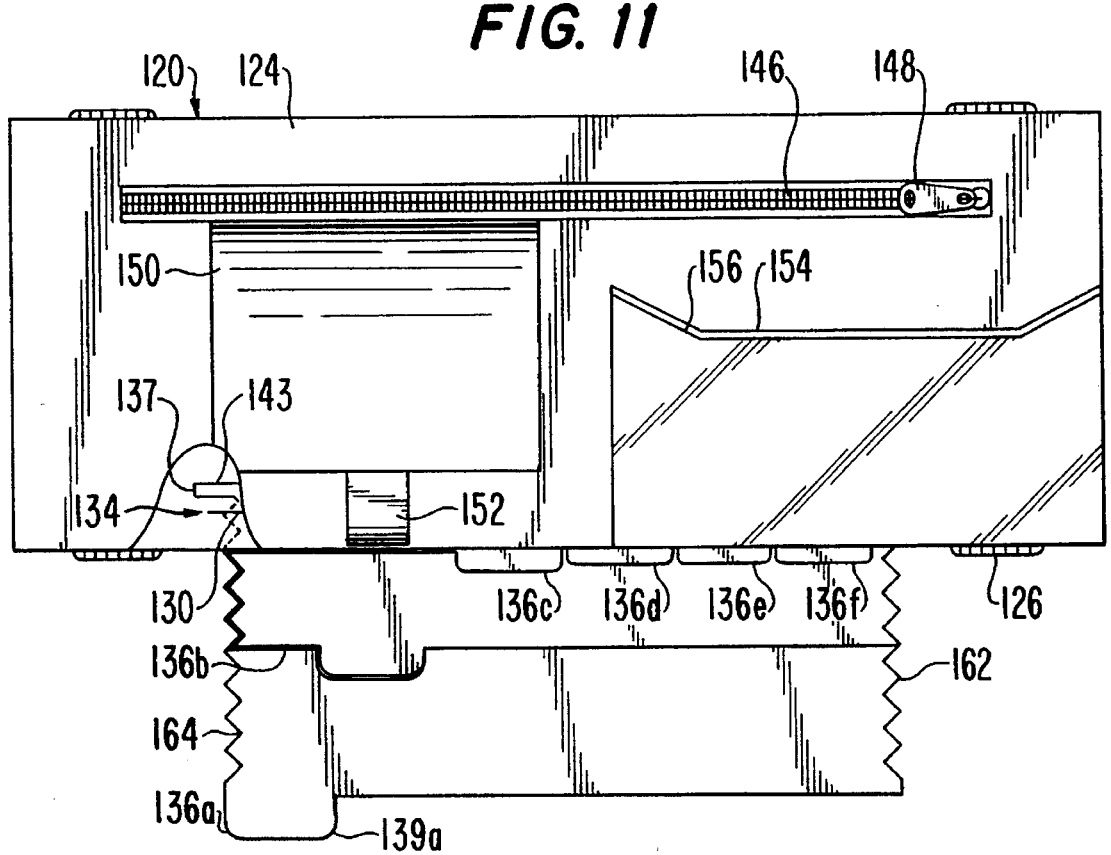

FIG. 10 diagrammatically illustrates accessory carrier 120 and particularly illustrates a back side or rear outer layer 122 of carrier 120. The front side of accessory carrier 120 is shown in FIG. 11 and is identified as outer, exposed or front layer 124. Returning to FIG. 10, carrier 120 includes at least one and preferably two straps 126 and 128 which are large enough to encircle visor 116 (FIGS. 8 and 9) rotatably mounted in the interior of the automobile. Preferably, the straps are made of a highly flexible material and most preferably, are made of an elastic material.

Back side layer 122 of accessory carrier 120 includes a longitudinal slot 130 having terminal ends 132 and 134. Preferably, accessory carrier 120 is rectangularly shaped. The overall rectangular size of the carrier is ideally about 80% percent of the size of the visor.

A plurality of tabbed dividers 136a, b, c, d, e, and f extend through and beyond longitudinal slot 130 and may be extended partially outward of the interior of carrier 120. Tabbed dividers or screens 136 are preferably made of cardboard or a similar material. However, one of the dividers may be tinted or opaque plastic and the others may be paper dividers. Tabbed dividers 136 each include a laterally extending finger tab (see finger tab 210 for divider 136d) for pulling the divider from the stored position shown in FIG. 10 to a laterally extended position shown in FIG. 11. In this embodiment, the tab is semicircular and protrudes from the lower longitudinal edge of the dividers, for example, edge 142 of divider 136a.

FIG. 11 diagrammatically illustrate accessory carrier 120 and particularly the front side outer layer 124. In use, back side 122 (FIG. 3) of carrier 120 is disposed adjacent to the visor. Front side 124 of carrier 120 enables the occupant to access a wide variety of accessory containment structures, such that the occupant can utilize compartments, folders and pockets at will. Back side 122 of accessory carrier 20 is mounted to adjacent visor 116 the elastic straps 126 and 128. The front side layer 124 includes a closeable, longitudinal slot 146 which includes a zipper closure 148. In one embodiment, front side 124 also includes an eye glass loop 150 which is shown in greater detail in as loop 50 in FIG. 6. Front side 124 also includes a pen or a pencil loop holder 152. Again, this loop or accessory holder is better shown in FIG. 6. Front side 124 includes at least a pair of pocket flaps 154 and 156. These flaps define at least two pockets. In FIG. 11 flap 154 defines a pocket and an interior space. Flap 156 is transparent and defines a pocket and an interior space. In one embodiment, pocket flaps 154 and 156 are attached to front side layer 124 by sewing or glue or a combination thereof. The sewn attachment is shown with an "x" in these illustrations (See FIG. 5).

FIG. 11 shows dividers 136a and 136b extended from the inner portion of accessory carrier 120. Dividers 136c through 136f are fully retracted and are stored in the unit 120. The dividers 136 are pulled from the interior portion of carrier 120 by pulling tabs 139. Dividers 136 include opposing sawteeth 162 and 164 which co-act and interact with the terminal ends 132 and 134 of longitudinal slot 130. Particularly, sawteeth 164 co-act with terminal end 134 of slot 130. This coaction enables the occupant to discretely position dividers 136 at various extension positions beyond the stored position shown in FIG. 10. In a sense, the sawteeth enable digital positioning of the dividers 136 with respect to accessory carrier 120 and also to the visor 116 itself, since carrier 120 is securely mounted to the visor 116. Dividers 136 are captured in the interior of the carrier 120 by a pair of opposing interior tabs, one of which is interior tab 137 extending from longitudinal edge 143. The opposing, interior tabs substantially prohibit to complete withdrawal of the dividers 136 from the interior space of the carrier by catching on the terminal ends of longitudinal slot 30.

As best seen in FIG. 10 dividers 136a–f have either writable surfaces on the finger tabs or pre-printed surface bearing common organizational indicia. Each of these dividers separate information which may be useful to an occupant of the automobile. For example, a user may wish to store telephone numbers behind the divider 136 labeled "PHONES." Other appropriate information may be segregated by dividers 136b–f. A user wishing to employ the information segregated by a divider 136a will extend dividers 136b from the position seen in FIG. 10 to the position in seen FIG. 11. A user may more readily remove the stored information that is segregated by the dividers 136a, 136b when the dividers are in an extended position as shown in FIG. 11.

It should be appreciated that automobiles customarily include visors for the driver and the front passenger. The accessory carrier or visor unit described herein can be used with any window visor in an automobile.

The claims appended hereto are meant to cover modifications and changes within the spirit and scope of the present invention.

What is claimed is:

1. In combination with an automobile having a window and a window visor adjacent thereto, said visor being rotatably mounted in said automobile with respect to said window, said visor having a predetermined thickness, an accessory carrier mountable on said visor comprising:

a three layer, generally planar, composite carrier having a thickness substantially the same as said predetermined visor thickness, said carrier having first and second outer layers and an intermediate layer, said first outer layer disposed adjacent said visor when said carrier is mounted thereto, said intermediate layer being intermediate said first outer layer and said second outer layer, said first and second outer layers being joined together along peripheral regions thereof and being substantially coextensive with each other;

said intermediate layer being a divider for an interior space defined by said first and second outer layers and completely dividing said interior space into first and second interior compartments;

an opaque sunscreen laterally extendable from a position substantially within said first interior compartment of said carrier through a complementary longitudinal slot in said first outer layer to a position substantially outside said first compartment, in said outside position, said screen forming a shade for an occupant of said automobile, said screen being stored within said first compartment when said screen is substantially within said first compartment, said screen having an outboard segment which is always exposed to the exterior of said carrier, said outboard segment defining an operator interface for pulling said screen from said stored position;

said screen having opposing sawteeth longitudinally extending from opposing sides of said screen, said sawteeth interactive with terminal ends of said complementary longitudinal slot in said first outer layer;

a closable, longitudinal slot on said second outer layer, said closable longitudinal slot defining a mouth for said second interior compartment within said carrier;

pocket flaps attached to said second outer layer which define at least two pockets for storage of accessories by said occupant on said carrier; and, at least one strap large enough to encircle said visor, said strap attached to said composite carrier such that said carrier can be detachably mounted on said visor.

2. A carrier, in combination with an automobile, as claimed in claim 1 including:

a plurality of flat plate dividers, one of which is said opaque screen, disposed in said first interior compartment.

3. A carrier, in combination with an automobile, as claimed in claim 2 wherein each said divider includes an indexing tab laterally extending therefrom.

4. A carrier, in combination with an automobile, as claimed in claim 3 including a loop defining one of an eyeglass case holder, a pencil holder and pen holder attached to said second outer layer.

5. A carrier, in combination with an automobile, as claimed in claim 4 wherein said pocket flaps are mounted atop one another.

6. A carrier, in combination with an automobile, as claimed in claim 5 wherein an outermost pocket flap is transparent.

7. A carrier, in combination with an automobile, as claimed in claim 6 wherein said closable, longitudinal slot on said second outer layer includes a zipper closure.

8. A carrier, in combination with an automobile, as claimed in claim 1 including a supplemental accessory carrier, said supplemental carrier being removably attachable to said second outer layer via hook and loop removable and separable fasteners attached to said second outer layer and said supplemental carrier, said hook fastener being separable from said supplemental accessory carrier such that said supplemental accessory carrier is removable from said composite carrier.

9. A carrier, in combination with an automobile, as claimed in claim 8 wherein said supplemental accessory carrier is one of an eyeglass case and a wallet, one of said hook and loop removable and separable fasteners attached to said eyeglass case and said wallet.

10. A carrier, in combination with an automobile, as claimed in claim 9 including a supplemental loop defining a pencil or pen holder attached to said second outer layer.

11. A carrier, in combination with an automobile, as claimed in claim 10 wherein said pocket flaps are mounted atop one another.

12. A carrier, in combination with an automobile, as claimed in claim 11 wherein an outermost pocket flap is transparent.

13. A carrier, in combination with an automobile, as claimed in claim 12 wherein said closable, longitudinal slot on said second outer layer includes a zipper closure.

14. In combination with an automobile having a window and a window visor adjacent thereto, said visor being rotatably mounted in said automobile with respect to said window, said visor having a predetermined thickness, art accessory carrier mountable on said visor comprising:

a three layer, generally planar, composite carrier having a thickness substantially the same as said predetermined visor thickness, said carrier having first and second outer layers and an intermediate layer, said first outer layer disposed adjacent said visor when said carrier is mounted thereto, said intermediate layer being intermediate said first outer layer and said second outer layer, said first and second outer layers being joined together along peripheral regions thereof and being substantially coextensive with each other;

said intermediate layer being a divider for an interior space defined by said first and second outer layers and completely dividing said interior space into first and second interior compartments;

an opaque sun shade screen laterally extendable from a position substantially within said first interior compartment of said carrier through a complementary longitudinal slot in said first outer layer to a position substantially outside said first compartment, in said outside position, said screen forming a shade for an occupant of said automobile, said screen being stored within said first compartment when said screen is substantially within said first compartment, said screen having an outboard segment which is always exposed to the exterior of said carrier, said outboard segment defining an operator interface for pulling said screen from said stored position;

a closable, longitudinal slot on said second outer layer, said closable longitudinal slot defining a mouth for said second interior compartment within said carrier;

pocket flaps attached to said second outer layer which define at least two pockets for storage of accessories by said occupant on said carrier; and, at least one strap large enough to encircle said visor, said strap attached to said composite carrier such that said carrier can be detachably mounted on said visor.

15. In combination with an automobile having a window and a window visor adjacent thereto, said visor being rotatably mounted in said automobile with respect to said window, said visor being a predetermined thickness, an accessory carrier mountable on said visor comprising:

a three layer, generally planer, composite carrier having a thickness substantially the same as said predetermined visor thickness, said carrier having first and second outer layers and an intermediate layer, said first outer layer disposed adjacent said visor when said carrier is mounted thereto, said intermediate layer being intermediate said first and said second outer layer, said first and second outer layers being joined together along peripheral regions thereof and being substantially coextensive with each other;

an intermediate layer being a divider for an interior space defined by said first and second outer layers and completely dividing said interior space to first and second interior compartments;

a plurality of flat plate dividers laterally extendable from a retracted, stored position substantially within said first interior compartment of said carrier through a complimentary longitudinal slot in said first outer layer to an extended position substantially outside said first compartment, respective exposed edge region of each said divider defining a tab portion for said corresponding divider, said tab portion of each divider being substantially exposed to the exterior of said carrier, said tab portions defining an operator interface for pulling each discrete divider from said stored position, said dividers utilized to sub-divide said first interior compartment;

each said divider having opposing sawteeth longitudinally extending from opposing sides of said respective divider, said sawteeth being interactive with terminal ends of said complimentary longitudinally slot in said first outer layer;

a closable, longitudinal slot on said second outer layer, said closable longitudinal slot defining a mouth for said second interior compartment within said carrier; and, at least one strap large enough to encircle said visor, said strap attached to said composite carrier such that said carrier can be detachably mounted on said visor.

16. A carrier, in combination with an automobile, as claimed in claim 15 wherein each tab portion defines a writable surface.

17. A carrier, in combination with an automobile, as claimed in claim 16 wherein said divider is made of paper.

18. A carrier, in combination with an automobile, as claimed in claim 17 including a supplemental loop defining a pencil or pen holder attached to said second outer layer.

19. A carrier, in combination with an automobile, as claimed in claim 18 including pocket flaps mounted on said first outer layer.

20. A carrier, in combination with an automobile, as claimed in claim 19 wherein an outer most pocket flap is transparent.

* * * * *